Dec. 1, 1953     F. D. FRISBY     2,660,913
RETAINING RING
Filed March 17, 1950
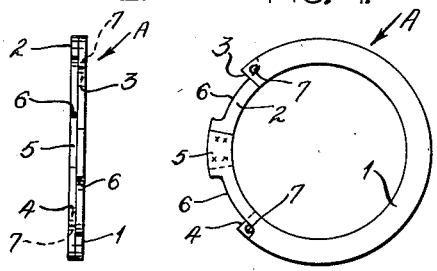
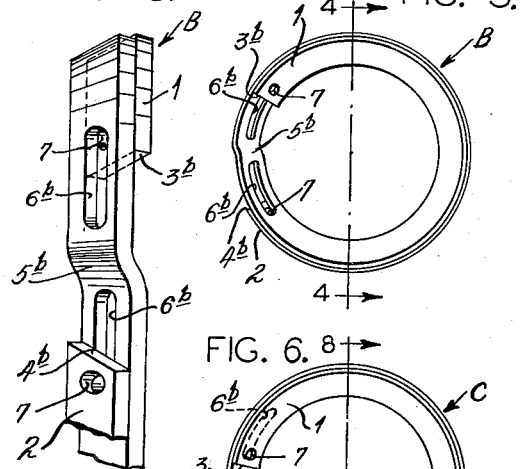
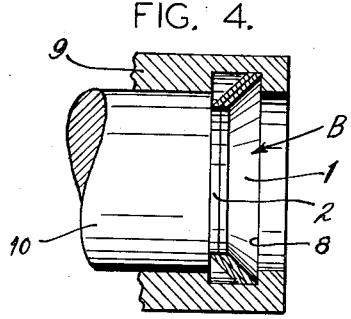
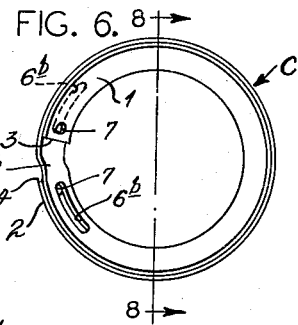
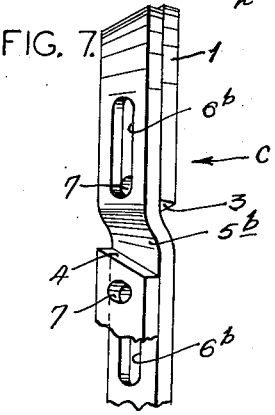
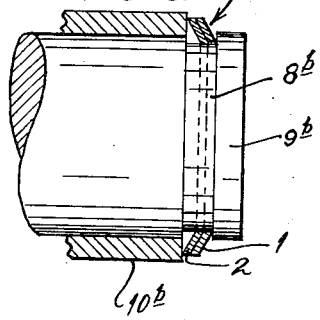
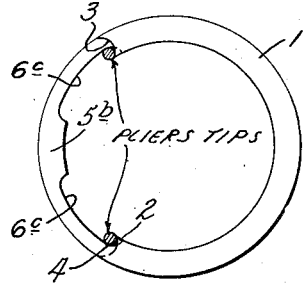
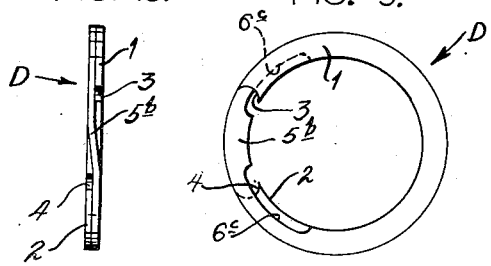
INVENTOR:
Frank D. Frisby,
by Carr & Carr & Gravely,
HIS ATTORNEYS.

Patented Dec. 1, 1953

2,660,913

UNITED STATES PATENT OFFICE 2,660,913

RETAINING RING

Frank D. Frisby, St. Louis, Mo., assignor to Frisby Corporation, St. Louis, Mo., a corporation of Missouri Application March 17, 1950, Serial No. 150,300

5 Claims. (Cl. 85—8.8)

This invention relates to improvements in retaining rings of the narrow class described in my United States Letters Patent No. 2,450,425 dated October 5, 1948.

The principal object of the present invention is to provide improved helical retaining ring forms which permit the use of long round nose pliers to install and remove said ring in a positive and easy manner under various conditions of application.

Another object is to provide a helical retaining ring structure formed of two separate turns bonded together at one point as shown and described.

Another object is to provide in a retaining ring a guide slot or notch which cooperates with a hole or an end of the ring, preferably concave, so that the ring can be held in an expanded or contracted position so that it will glide over any grooves or obstructions in the housing member on which it is mounted.

Another object is to provide helical retaining rings which can be installed or removed with long round nose pliers by expanding or contracting the ring within a controlled circular shape.

Still another object is to provide helical retaining rings having a conical shape capable of resisting thrust loads while taking up end play between the parts.

This invention is embodied in a flexible helical retaining ring comprising two annular coils lying in adjacent intimate relation and connected by an offset portion, in combination with the novel features hereinafter described and claimed.

A conical shaped helical retaining ring may be described as one having an angle of not less than 30° and not more than 70° from the axis of the ring when installed in operating position.

An internal ring is one which expands into a groove in the inside diameter of a housing or part. Such a ring must be contracted for installation and removal.

An external ring is one which contracts into a groove on the outside diameter of a shaft or part. Such a ring must be expanded for installation and removal.

The heel section of a ring is the area on either side of a point located at the greatest distance from each of the ends of the ring. This point is in the center of the heel section.

The invention also consists in the combinations and arrangements of parts hereinafter described and claimed. In the accompanying drawings, which form part of this specification, and wherein like numerals refer to like parts wherever they occur.

Fig. 1 is a plan view of a pair of separate coils bonded or attached at the point indicated by the mark "X" to form an internal helical retaining ring, Fig. 2 is an end view of the ring shown in Fig. 1, Fig. 3 is a plan view of a modified form of an internal helical retaining ring having a conical shape, Fig. 4 is a vertical cross-sectional view of the ring shown in Fig. 3 taken along the line 4—4 therein and showing the ring in retaining or operative position, Fig. 5 is an enlarged fragmentary end view of the offset and ends of the ring shown in Fig. 3, Fig. 6 is a plan view of an external helical retaining ring having a conical shape, Fig. 7 is an enlarged fragmentary end view of the offset and ends of the ring shown in Fig. 6, Fig. 8 is a vertical cross-sectional view the ring shown in Fig. 6 taken along the line 8—8 therein and showing the ring in retaining or operative position, Fig. 9 is still another modified form of an external helical retaining ring, Fig. 10 is an end view of the ring shown in Fig. 9, and Fig. 11 is a view of the ring shown in Fig. 9 in its expanded position.

The internal helical retaining ring construction A shown in Figs. 1 and 2 comprises two separate annular coils 1 and 2 having ends 3 and 4 respectively. The coils 1 and 2 are separate coils bonded together at one end of each coil at the point marked "X" to form an offset portion 5 so that the coils 1 and 2 will lie in adjacent parallel planes in intimate relation. This ring is formed of two separate coils for the purpose of simplifying methods of manufacture to reduce the overall production costs.

The offset portion 5 has guide notches 6 on either side thereof positioned to cooperate with holes 7 provided in the ends 3 and 4 of the coils 1 and 2. These guide notches 6 located on the outer circumference of each coil and near the offset portion 5 also add flexibility to each coil of the ring and act as stops to prevent overstressing of the coils.

The flexibility and stop action obtained as a result of the guide notches is secondary to the main object of the guide notches of controlling ring circularity during expansion and contrac- Obviously, this ring may be made as an external helical retaining ring by substituting guide slots for the guide notches 6 and substituting concave shaped ends for the holes 7 provided in the internal form of the ring.

The internal helical ring construction B shown in Figs. 3 through 5 comprises two separate annular coils 1 and 2 having ends 3b and 4b, respectively. The coils 1 and 2 are connected by an offset portion 5b so that said coils will lie in adjacent intimate relation. The ends 3b and 4b of the coils 1 and 2 are provided with holes 7. The offset portion 5b has guide slots 6b on either side thereof positioned to register with holes 7 located in the ends 3b and 4b of the coils 1 and 2.

In Fig. 4, the ring B is shown assembled in an annular groove 8 in a housing 9 holding a retained member 10 therein. The holes 7, which are in registering relation with the guide slots 6b, are in a clear position to receive the tips of long round nose pliers. In operation, the insertion of the tips of long round nose pliers through the holes 7 and the registering guide slots 6b of the ring B and the bringing of the tips of the pliers together will contract the ring and keep it in circular form during the contraction. This arrangement provides for a maximum change of diameter of the coils of the ring with a minimum movement of the pliers. The guide slots 6b located near the offset portion 5b also add flexibility to each turn of the ring and act as stops to prevent overstressing of the coils.

Ring B is shown as a conical shaped ring having a free angle of 30° with axis of the ring and compressed so that the angle will be 45° in assembled relation, as shown in Fig. 4, in the annular groove 8 in the housing 9 to retain the retained member 10.

The ring C shown in Figs. 6 through 8 is an external form of the ring B. The ring C comprises two annular coils 1 and 2 having ends 3b and 4b each with a hole 7 therein. The coils 1 and 2 are connected by an offset portion 5b having guide slots 6b on either side thereof, said guide slots 6b positioned to register with said holes 7.

In Fig. 8, the ring C is shown assembled in an annular groove 8b in the periphery of a housing or shaft 9b holding a retained member 10b therein. The holes 7, which are in registering relation with the guide slots 6b, are in a clear position so that long round nose pliers may be inserted therethrough.

In Figs. 6 and 7 the ring C is shown having a free angle of 30° with the axis of the ring and is shown compressed to a 60° angle in assembled relation in Fig. 8. The holes 7 in the external ring C are positioned at or near the ends of the guide slots 6b near the offset portion 5b so that the ring C may be expanded for installation and removal, whereas the holes 7 in the internal ring B are positioned at or near the ends of the guide slots 6b away from the offset portion 5b so that the ring B may be contracted for installation and removal. The guide slot and registering hole feature of rings B and C makes it possible to firmly grip the ring and hold it in an expanded or contracted position so that it will glide over any grooves or obstructions in the housing member when installing or removing said helical retaining ring.

If a conical shaped form is desired for rings B and C, the angle should not be less than 30° and not more than 70° from the axis of the ring when installed in operating position. This allows the ring to resist thrust loads and take up end play between the assembled parts. Obviously, the conical feature of each of ring constructions B and C is optional and can be omitted. On the other hand, the ring construction A may be provided with the conical feature if desired.

In the external helical ring construction D shown in Figures 9 and 10, the ring D comprises two annular coils 1 and 2 having concave ends 3 and 4, respectively, which are preferably in a V-shape with a curved portion having a small radius at the apex thereof. This ring is provided with elongated guide notches 6c on each side of the offset portion 5b which cooperate with the curved portion of the convex ends 3 and 4 of the coils 1 and 2. The notches 6c and the V-shaped ends 3 and 4 cooperate to form an easy means for expanding the ring with the plier tips. The inside edges of the notches 6c act as guides for controlling the circularity of the shape of the ring when the ring is expanded for installation or removal from a groove. This construction provides positive sliding guide means within the heel section so that controlled circularity is maintained at all times as the diameter of the ring changes. The tips of the pliers project through both coils to control the circularity of both coils during expansion or contraction of the ring and the heel section is spaced from the axial center of the ring at all times a distance equal to the radius of the ring, said heel section always having the same radius as the radius of the ring. In operation, as plier pressure is applied, the coils will gradually assume a dished or frusto-conical shape; however, this does not interfere with the coils maintaining circularity over their required range of movement. Obviously, ring D may be made as an internal ring and/or may incorporate the conical feature hereinbefore described. The notches 6c located near the offset portion 5b also add flexibility to the ring and act as stops to prevent overstressing of the coils.

The helical retaining rings hereinbefore described possess internal frictional resistance between the coils which is utilized to resist expanding and contracting movement of the coils when the ring receives a thrust load in normal operating position. This increases the safe thrust load factor and efficiency of the ring.

What I claim is:

1. A retaining ring comprising two annular coils lying in adjacent intimate relation and connected by an offset portion, said ring having a heel section with guide means therein, said coils having means near the ends thereof which cooperate with said guide means upon insertion of pliers tips through both of said means on each side of said offset portion, all of said means being within the inner and outer circumferential edges of said ring.

2. A retaining ring comprising two annular coils lying in intimate relation and connected by an offset portion, said ring having guide notches on the outer circumference within the heel section, said coils having holes near the ends thereof which cooperate with said guide notches upon insertion of a pliers tip through both of said means on each side of said offset portion for circumferentially controlling the circularity of both coils during contraction and expansion of said ring.

3. A retaining ring comprising two annular coils lying in adjacent intimate relation and connected by an offset portion, said ring having a heel section with guide means therein, said coils having means near the ends thereof which cooperate with said guide means upon insertion of pliers tips through both of said means on each side of said offset portion, said coils having a frusto-conical shape for acting as a spacer ring between assembled parts, all of said means being within the inner and outer circumferential edges of said ring.

4. A retaining ring comprising two annular coils lying in intimate relation and connected by an offset portion, said ring having a heel section with guide slots therein, said coils having holes near the ends thereof which cooperate with said guide slots upon insertion of pliers tips through said cooperating slots and holes on each side of said offset portion, to circumferentially control the circularity of both coils during expansion and contraction of said ring.

5. A retaining ring comprising two annular coils lying in intimate relation and connected by an offset portion, said ring having guide notches on the inner circumference within the heel section, said coils having concave ends which cooperate with said guide notches upon insertion of a pliers tip through both of said coils on each side of said offset portion, to circumferentially control the circularity of both coils during expansion and contraction of said ring.

FRANK D. FRISBY.

References Cited in the file of this patent

UNITED STATES PATENTS

| Number | Name | Date |
|---|---|---|
| 491,469 | Carver | Feb. 7, 1893 |
| 2,255,217 | Hill | Sept. 9, 1941 |
| 2,322,138 | Jenny | June 15, 1943 |
| 2,450,425 | Frisby | Oct. 5, 1948 |

FOREIGN PATENTS

| Number | Country | Date |
|---|---|---|
| 481,970 | Great Britain | Mar. 22, 1938 |
| 873,965 | France | July 24, 1942 |